Aug. 4, 1970 D. K. MILLER 3,523,196
BIDIRECTIONAL TRANSMISSION GATE HAVING SINGLE CONTROL INPUT
Filed July 30, 1968
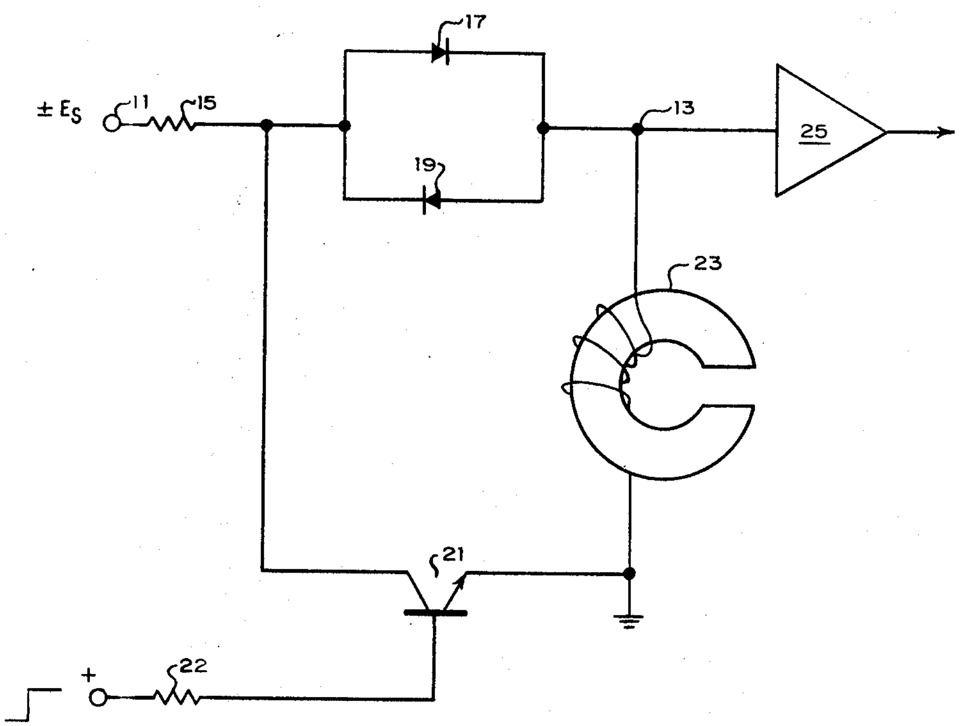
INVENTOR
DONALD K. MILLER
BY Stephen P. Fox
AGENT United States Patent Office 3,523,196

Patented Aug. 4, 1970

3,523,196

BIDIRECTIONAL TRANSMISSION GATE HAVING SINGLE CONTROL INPUT

Donald K. Miller, San Jose, Calif., assignor to Hewlett-Packard Company, Palo Alto, Calif., a corporation of California Filed July 30, 1968, Ser. No. 748,833
Int. Cl. H03k 5/08
U.S. Cl. 307—248 5 Claims

ABSTRACT OF THE DISCLOSURE

A bidirectional transmission gate includes two oppositely poled silicon diodes connected in parallel for conducting dual polarity signals from a source terminal to a load terminal. A transistor has a main current carrying path connected between the source terminal and ground. When the transistor is suitably biased, it operates in both a normal and an inverted mode to conduct the dual polarity input signals to ground, thereby rendering the two diodes non-conductive. The conduction of the bidirectional transmission gate is controlled by a single signal applied to the base electrode of the transistor.

BACKGROUND OF THE INVENTION

A bidirectional transmission gate is one which selectively conducts dual polarity input signals to a load. This type of gate may be used, for example, in digital circuit applications for driving a magnetic head in a recording mode with binary signals represented by positive and negative voltage levels. In the playback mode, the magnetic head becomes an active load, and the transmission gate should operate to block the recording signals from the head and associated output amplifiers to prevent adverse interference between the small playback signals and the large recording signals. Preferably the bidirectional transmission gate should have linear transfer characteristics and a transfer function of unity in the operating range thereof, so as to prevent signal distortion. Additionally, although prior art bidirection transmission gates generally require dual polarity gate control signals, it is preferable to be able to control gate conduction with only a single control input.

SUMMARY OF THE INVENTION

In accomplishing the foregoing desirable purposes, the bidirectional transmission gate of present invention, in one embodiment, comprises a pair of parallel diodes connected with opposite directions of conductivity between a bipolar signal source and a load, such as a magnetic head. A transistor has its two main current carrying electrodes connected in series between the bipolar signal source input to the parallel diodes and a source of reference potential. A control input signal biases the transistor into conduction or non-conduction. When the transistor is non-conducting, the bipolar signals are transmitted to the load through the parallel diodes. When the transistor conducts, it operates in either a normal or inverted mode, depending on the polarity of the input signal. In either of these two modes, the voltage across the two main current carrying electrodes of the transistor is less than the forward voltage drop across either of the parallel diodes. Therefore these diodes do not conduct and the bipolar input signal is electrically disconnected from the load. If the load is a magnetic head, for example, the playback signals therefrom are thus unaffected by the recording circuitry.

BRIEF DESCRIPTION OF THE DRAWING

The single figure of the drawing is a schematic diagram illustrating the preferred embodiment of the invention.

DESCRIPTION OF THE PREFERRED EMBODIMENT

Referring now to the figure, there is shown a bidirectional transmission gate including an input terminal 11 for receiving a bipolar signal $\pm E_S$, and an output terminal 13 connected to an active load, hereinafter described. Connected between the input and output terminals 11, 13, is a resistor 15 and a pair of oppositely poled parallel silicon diodes 17, 19. An NPN type transistor 21 has an emitter electrode connected to a source of reference potential or ground, and a collector electrode connected to the junction of resistor 15 and diodes 17, 19. The conduction of transistor 21 is controlled by a biasing signal applied to the base electrode thereof through a resistor 22, as shown.

In the illustrated embodiment of the invention, the active load is a magnetic recording head 23 having a transducing coil connected between output terminal 13 and ground. The magnetic head is operable in a recording mode in response to the bipolar signals $\pm E_S$ from the input terminal 11, and in a playback mode wherein playback signals generated by the magnetic head are applied to a preamplifier 25 and thence to additional utilization circuitry, not shown. Optimum operation in the recording mode is achieved when the bipolar input signals $\pm E_S$ are binary in nature; however analog input signals may also be used, although there may be some loss in signal clarity due to the energy gaps or forward voltage drops in the diodes 17, 19.

In operation of the bidirectional transmission gate, when transistor 21 is biased into non-conduction by a base control signal, the positive and negative input signals $\pm E_S$ are transmitted to the magnetic head 23 by diodes 17 and 19, respectively. In this situation, the magnetic head would be used to record the signals $\pm E_S$, which typically may be about $\pm 7$ volts in magnitude. When transistor 21 is biased into conduction by a positive control signal, at its base electrode, the transistor operates as a current switch in two different modes, hereinafter described, depending on the polarity of the input signal $\pm E_S$. In both of these modes, the voltage offset or drop between the emitter and collector electrodes of transistor 21 is small, on the order of .025 to .2 volt. Since diodes 17, 19 are of the silicon type, they have a forward voltage drop of about .6 volt, which is higher than the drop across transistor 21. Therefore, any signals appearing at the input terminal 11 will be shunted to ground through current limiting resistor 15 and transistor 21, and diodes 17, 19 will be non-conducting, so as to isolate the input terminal 11 from the output terminal 13.

It can be seen that proper operation requires that the voltage drop across transistor 21 be less than that across the diodes 17, 19. The isolation of the input and output terminals is maintained even with active loads, i.e. those which generate output signals. However the generated signal must be less than the forward voltage drop of diodes 17, 19 to prevent these diodes from conducting. In the case where the active load is a magnetic head, as shown, the playback signals therefrom are small, on the order of a few millivolts. Therefore diodes 17, 19 do not conduct, and the playback signals are not adversely affected by the bipolar drive signals $\pm E_S$ and the associated input circuitry (not shown).

As noted hereinabove, when transistor 21 is biased on, it conducts in two different modes, depending on the polarity of the input signal $\pm E_S$. Specifically, when the input signal to terminal 11 is positive, transistor 21 operates in a saturated mode with a normal current gain. However, when the input signal is negative, the transistor operates in an inverted mode. In one type of operation in the latter mode, the base current is less than the current from the signal source $E_S$, and the collector and emitter electrodes may be viewed as effectively electrically interchanged. In another type of operation in the latter mode, the base current supplied through resistor 22 exceeds the current from source $E_S$, and the transistor may be viewed as two forward-biased diodes which conduct different degrees of current from the base electrode to maintain the emitter and collector electrodes at substantially the same voltage. The double mode conduction of the transistor 21 permits the bidirectional transmission gate to be controlled by a single control input signal applied to the base electrode of the transistor.

What is claimed is:

1. A bidirectional transmission gate circuit comprising:

a pair of asymmetrically conducting elements connected in parallel and poled in opposite directions of conductivity, said pair of parallel connected elements having two opposite end terminals, each of said pair of elements having a predetermined forward voltage drop;

input terminal means connected to one of said two opposite end terminals for receiving dual polarity signals;

load terminal means connected to the other of said two opposite end terminals;

a transistor having first and second main current carrying electrodes and a control electrode;

said first main current carrying electrode being connected to said one of said two opposite end terminals;

said second main current carrying electrode being connectable to a source of reference potential; and said control electrode being connectable to a source of potential for conditioning said transistor to conduct in normal and inverted modes in response to said dual polarity input signals, and thereby to provide a low voltage drop across said first and second main current carrying electrodes, said low voltage drop being less than the predetermined forward voltage drop of either of said pair of asymmetrically conducting elements.

2. The transmission gate circuit of claim 1 wherein each one of said pair of asymmetrically conducting elements is a silicon diode.

3. The transmission gate circuit of claim 1, further including active load means connected to said load terminal, said active load means being operable to provide dual polarity output signals having a magnitude less than the predetermined forward voltage drop of either of said pair of asymmetrically conducting elements.

4. The transmission gate circuit of claim 3 wherein said active load means is a magnetic recording head.

5. The transmission gate circuit of claim 1, further including current limiting resistance means connected in series between said input terminal means and said one of said two opposite end terminals.

References Cited

UNITED STATES PATENTS

| | | | |
|---|---|---|---|
| 3,071,651 | 1/1963 | Prankel | 307—249 |
| 3,286,031 | 11/1966 | Geddes | 307—253 |

JOHN S. HEYMAN, Primary Examiner

B. P. DAVIS, Assistant Examiner

U.S. Cl. X.R.

307—237, 256